Patented Jan. 14, 1930

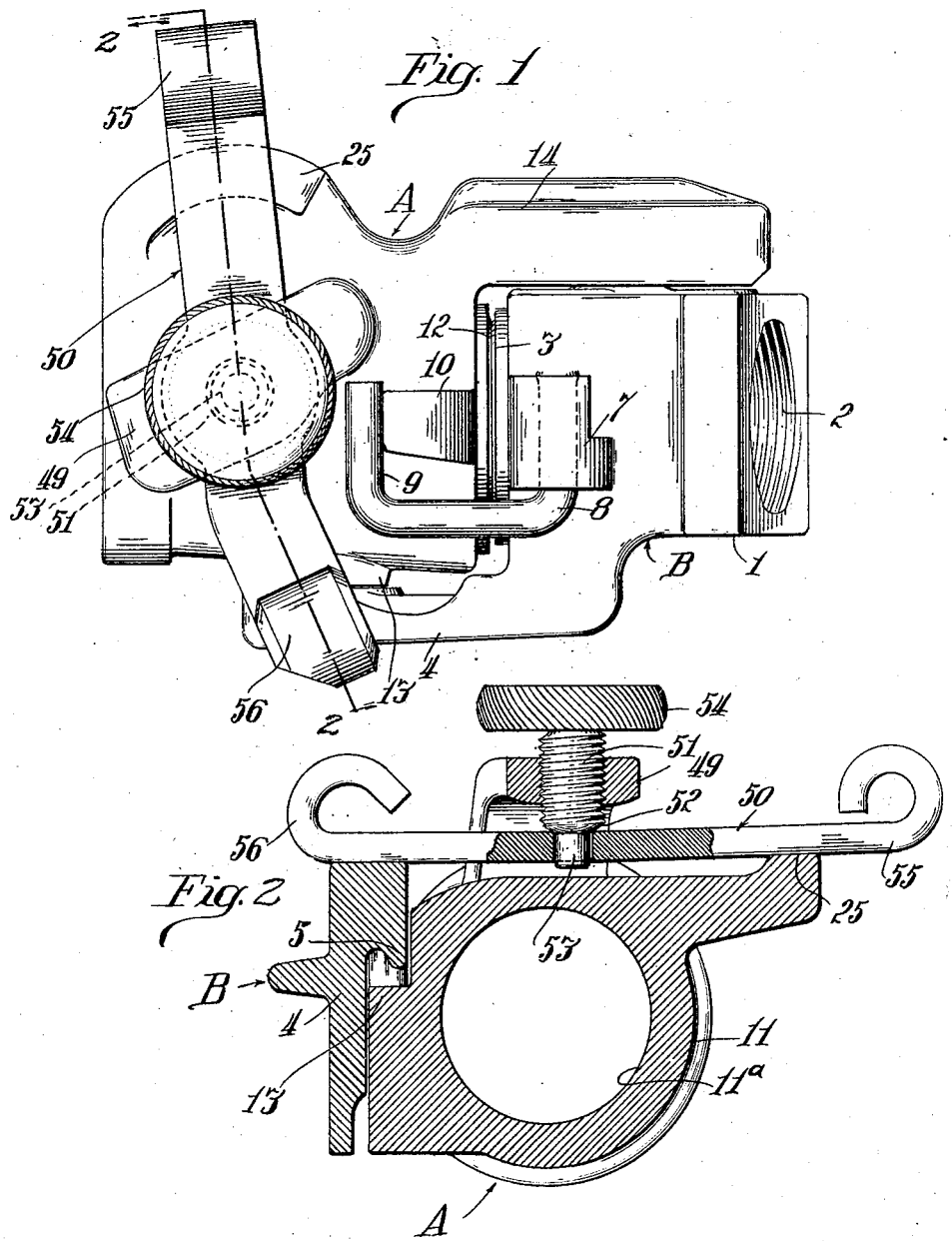

1,743,288

UNITED STATES PATENT OFFICE

EDWARD A. RUSSELL AND THOMAS H. MANCHESTER, OF CHICAGO, ILLINOIS, ASSIGNORS TO VAPOR CAR HEATING COMPANY, INC., OF CHICAGO, ILLINOIS, A CORPORATION OF NEW YORK

HOSE COUPLER

Application filed April 21, 1927. Serial No. 185,621.

This invention relates to hose couplings for connecting together the hoses or equivalent flexible metallic structures on the train pipes, steam or air, of railway cars; and the object of the invention is to provide, more particularly in couplings for steam train pipe connections, new and improved means for locking together the couplers or mating members of the coupling.

It has been customary to provide couplers with locking devices of one sort or another, which are forced with wedging pressure against the arms of the mating couplers to hold the couplers in locked relation as against the tendency to be rocked on their cams and disengaged by pull on the hoses when the train rounds a curve, for example. Such positive wedge locks are effective, so far as this purpose is concerned, but the wedging pressure, especially as the locks are frequently driven into place by a hammer, is likely, at least in case of certain types of wedge locks, to injure the gaskets and also to strain or bend the coupler arms and mutilate the cams.

This invention relates to a type of wedge lock which will yield so that injury to the couplers and gasket is prevented and the efficiency of the lock increased and its manipulation made easier.

One object of the invention is to provide a locking device which is swung to locking position and simultaneously wedged yieldably into engagement with the arm of a mating coupler.

More specifically the invention relates to a device wherein an intermediately pivoted resilient locking bar is mounted so that one end thereof will ride up a fixed wedge or cam as the bar is swung to locking position, thus tilting the other end downwardly against the member to be locked. The fulcrum for the bar is formed on a vertically adjustable screw, whereby additional locking pressure may be applied after the bar has been swung to locking position.

Other objects and advantages of this invention will be more apparent from the following detailed description of one approved form of the apparatus.

In the accompanying drawings:

Fig. 1 is a plan view of a hose coupler constructed in accordance with this invention, and shown as mated with a coupler of known construction.

Fig. 2 is a vertical section taken substantially on the line 2—2 of Fig. 1.

Referring to the drawings, a hose coupler is illustrated consisting of two members or couplers A and B; coupler A being provided with the lock of the present invention and the coupler B being a hose coupler of known type. The coupler of this invention is designed so that it will mate with any of the different types of so-called gravity hose couplers now in use on steam railroads in this country for making the connection between the steam train pipes on adjacent cars of railroad trains; coupler B being shown as typical or illustrative of couplers of this general class of which there are several different makes.

Coupler B consists of a head 1 formed with the steam port 2, in which is arranged a gasket 3, and with a forwardly projecting arm 4 provided with an undercut lug or cam 5, and on the other side of the head from arm 4 with a cam lug 6. Projecting from the top of head 1 is a lug 7 in which is pivoted a locking link 8, the angularly disposed end 9 of which is adapted to engage with a lug 10, formed on the mating coupler member.

The improved coupler A comprises a head 11 formed with a steam port 11$^a$, a gasket 12 being suitably positioned in a gasket seat at the outer end of port 11$^a$. On one side of the coupler head 11 is the usual under-cut lug or cam 13 adapted to be engaged by the cam 5 of coupler B. The arm 14 of coupler A consists of a curved or concavo-convex web portion terminating in a thickened portion provided with a cam adapted for engagement with a cam similar to cam 13 but formed on the head of coupler B.

The improved locking device forming the subject matter of the present invention is carried by the coupler member A. Arranged diagonally on top of and preferably cast integral with the head 11 is a housing or bracket consisting of a pair of upright members connected by a substantially horizontal cross-bar 49. The locking bar 50 is formed of a bar of resilient or spring metal, capable of yielding or flexing to some extent, and is preferably provided with return bent or looped end portions 55 and 56 which serve as heads to be engaged by a hammer or other tool in the process of driving the locking member from one position to another. The locking bar is apertured at an intermediate point so that it may be loosely pivoted on the downwardly projecting end 53 of a screw bolt 51, mounted for vertical adjustment in the cross member 49 of the bracket. Screw 51 is provided with a hand-wheel or nut 54 at its upper end whereby it may be adjusted up and down through the bracket 49. The lower end of screw 51 is provided with a rounded or spherical lower end portion 52, from which projects downwardly the pin or stud 53, on which the locking bar 50 is pivoted. An arcuate cam or wedge surface 25 is formed on the upper face of head 11, concentric with the pivot pin 53. When the locking bar 50 is rotated to locking position, the end 55 of the bar will ride up over the cam or wedge surface 25 thereby tilting the bar so as to force the other end 56 downwardly into firm engagement with the arm 4 of the mating coupler.

When in disengaged or unlocked position, the bar 50 is swung counter-clockwise from the position shown in the drawings, and it will be noted that the bar is bent slightly to one side adjacent the end 56 so that this head 56 may swing completely clear of the arm 4 of the mating coupler without having the intermediate portion of the locking bar engage the lug 10 on the head 11.

When a pair of couplers such as A and B have been brought into mating engagement with one another, by simultaneously swinging the projecting arms on each coupler into engagement with the cams on the other coupler member, the locking bar 50 is swung or driven around in a clockwise direction to the position shown in the drawings. The end 55 of the locking bar will ride up the fixed wedge 25, and the intermediate portion of the bar will swing horizontally about the pivot pin 53 and will also rock vertically about the fulcrum surface 52 on screw bolt 51 so that the opposite end 56 of the locking bar will be forced downwardly upon the arm 4 of mating coupler B, as the locking bar is swung into locking position above this arm. However, during this portion of the locking operation the engagement between locking bar 50 and arm 4 will not be particularly forceful and the bar 50 can easily yield, due to its resiliency to prevent injury to any of the engaging parts. When the bar has been moved completely to this locking position, the screw 51 may be screwed down through the bracket 49, thus forcing the fulcrum surface 52 downwardly against the intermediate portion of the locking bar.

This will serve to additionally flex this bar or place it under added tension, so that a very tight engagement of the locking bar with both the wedge surface 25 and the arm 4 is accomplished. The unlocking operation will be simply the reverse of the movements hereinabove described.

When a coupler of type A is coupled with a coupler of type B, as shown in Fig. 1, the locking link 8 may be swung into engagement with lug 10 after the locking bar 50 has been moved to locking position. When two similar couplers A, each equipped with this improved locking means, are coupled with one another, each of the locking devices will be driven to locking position in the manner hereinabove described. In such a combination, there will be no coupler link 8 and the lugs 10 on the coupler heads will not be used, these being provided for use merely when one of the improved couplers A is connected with an old type coupler, such as B.

It is not absolutely essential that the locking member 50 be yieldable, and some of the advantages of this invention would be retained if the rigid locking bar were used. However, it is preferable and a better operation is obtained and there is less likelihood of injury to any of the parts, if the locking bar is formed of spring material capable of yielding to a limited extent.

It will be apparent that the device would be operative, in a manner, if the wedge 25 were omitted, the screw 51 being relied upon entirely to secure the yielding locking engagement after the spring bar has been swung to its operative locking position. In such a case, the end 55 of the locking bar would simply engage against a raised surface on the head 11, substantially as indicated in Fig. 2.

We claim:

1. A hose coupler comprising a head provided with a wedge surface and a projecting arm, the head and arm having means adapted to engage respectively with the arm and head of a mating coupler, a locking member intermediately pivoted on the head and adapted when rotated to locking position to engage at its respective ends the wedge surface and the arm of the mating coupler, and a screw member having thereon a fulcrum shiftable by adjustment of the screw member engaging the intermediate portion of the locking member.

2. A hose coupler comprising a head provided with a wedge surface and a projecting arm, the head and arm having means adapted to engage respectively with the arm and head of a mating coupler, a bracket on the head, a screw vertically adjustable in the bracket and formed with a curved fulcrum surface at its lower end from which a pivot pin projects downwardly and a locking bar intermediately loosely pivoted on the pin whereby it may be rotated substantially horizontally to locking position to engage at its respective ends with the wedge surface and the arm of the mating coupler, the engagement with the wedge causing the bar to tilt about its fulcrum on the screw, further tilting of the bar being brought about by subsequently adjusting the screw downwardly through the bracket.

3. A hose coupler comprising a head provided with a wedge surface and a projecting arm, the head and arm having means adapted to engage respectively with the arm and head of a mating coupler, a bracket on the head, a screw vertically adjustable in the bracket and formed with a curved fulcrum surface at its lower end from which a pivot pin projects downwardly, and a resilient locking bar intermediately loosely pivoted on the pin whereby it may be rotated substantially horizontally to locking position to engage at its respective ends with the wedge surface and the arm of the mating coupler, the engagement with the wedge causing the bar to tilt about its fulcrum on the screw and to be flexed in a vertical plane, further flexure of the bar being brought about by subsequently adjusting the screw downwardly through the bracket.

4. A hose coupler comprising a head provided with a projecting arm, the arm and head having means adapted to engage respectively with the head and arm of a mating coupler, a bracket on the head, a screw vertically adjustable in the bracket and having a stud on its lower end, and a locking bar intermediately pivoted on the stud and fulcruming against the lower end of the screw and adapted when rotated to locking position to engage at its respective ends a portion of the head and the arm of the mating coupler.

EDWARD A. RUSSELL.
THOMAS H. MANCHESTER.